Dec. 9, 1947.   E. P. PAXMAN   2,432,487
SUPPORTING INTERNAL-COMBUSTION ENGINES TO
FACILITATE ADJUSTMENT AND REPAIR
Filed Sept. 17, 1943   5 Sheets-Sheet 1

INVENTOR
Edward Philip Paxman
BY
ATTORNEYS

Dec. 9, 1947.  E. P. PAXMAN  2,432,487
SUPPORTING INTERNAL-COMBUSTION ENGINES TO
FACILITATE ADJUSTMENT AND REPAIR
Filed Sept. 17, 1943  5 Sheets-Sheet 2

INVENTOR
Edward Philip Paxman
BY
ATTORNEYS

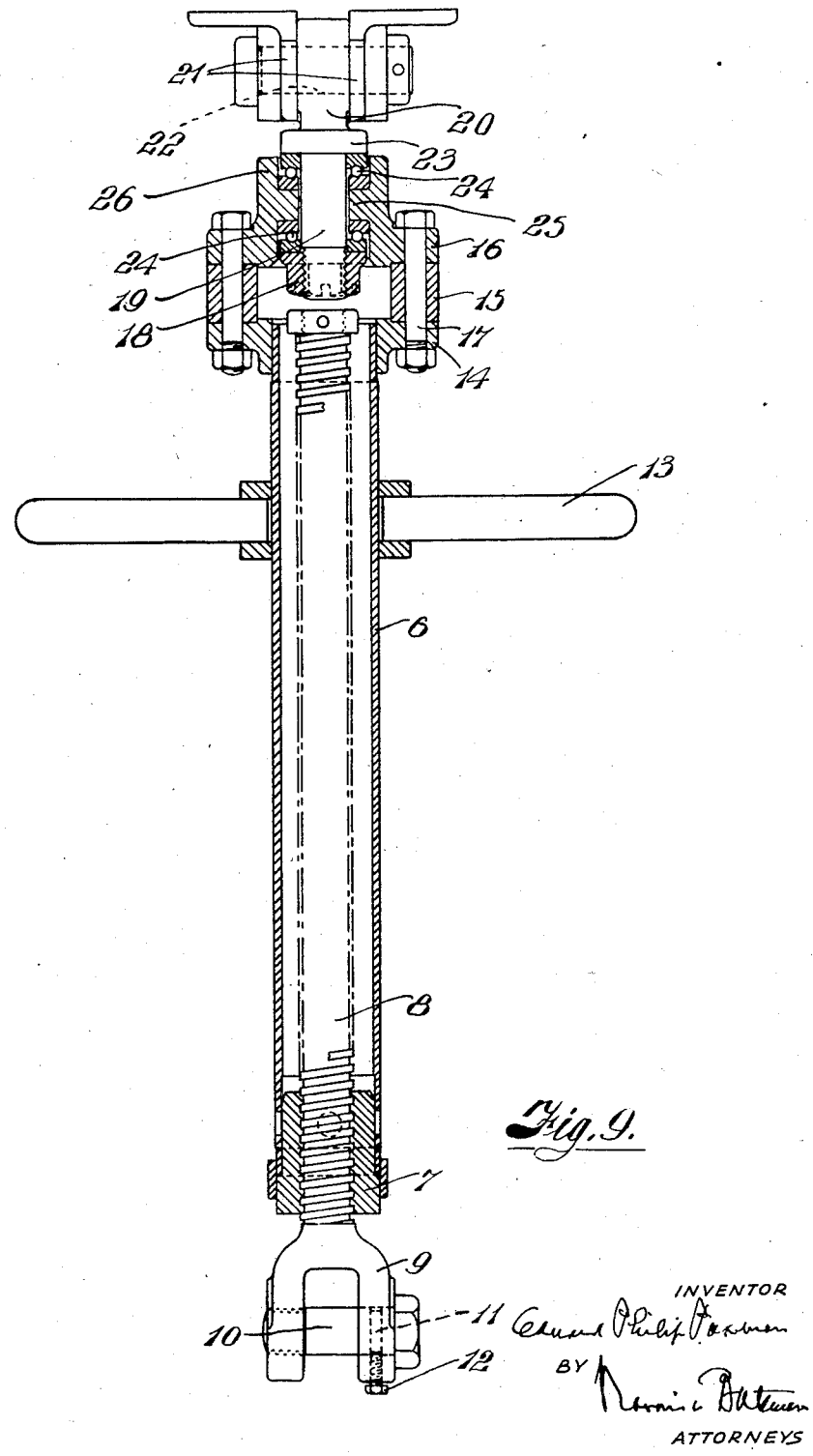

Dec. 9, 1947.   E. P. PAXMAN   2,432,487
SUPPORTING INTERNAL-COMBUSTION ENGINES TO
FACILITATE ADJUSTMENT AND REPAIR
Filed Sept. 17, 1943   5 Sheets-Sheet 4

INVENTOR
Edward Philip Paxman
BY
ATTORNEYS

INVENTOR
EDWARD PHILIP PAXMAN
By
ATTORNEYS

Patented Dec. 9, 1947

2,432,487

UNITED STATES PATENT OFFICE 2,432,487

SUPPORTING INTERNAL-COMBUSTION ENGINES TO FACILITATE ADJUSTMENT AND REPAIR

Edward Philip Paxman, Colchester, England

Application September 17, 1943, Serial No. 502,842
In Great Britain May 15, 1942

4 Claims. (Cl. 29—289)

1

This invention relates to internal combustion engines and has particular reference to engines of the kind which operate in confined spaces such as frequently occur in ships.

The object of the invention is to provide means for readily changing the position of an engine to render easily accessible any component part which requires servicing, such as inspection, repair or replacement thereby avoiding the necessity for dismantling an engine wholly or in part in order to gain access to a component which cannot be reached or inspected through any of the usual apertures in an engine housing.

According to the present invention an internal combustion engine is provided with devices which co-operate to form a cradle to support the ends of the crank shaft directly or indirectly in such manner that the engine as a whole can be rotated about a horizontal axis and held in any desired position where access can most readily be gained to a component requiring repair or other attention.

According to one form of the invention the means for tilting an internal combustion engine include devices for supporting the ends of the crank shaft and devices adapted to be attached to the engine housing for causing it to be partially rotated around the axis of the crank shaft and held in a position wherein otherwise inaccessible components can be repaired, adjusted or replaced.

According to the preferred form of the invention the means for tilting an internal combustion engine comprise means for supporting the ends of the crank shaft and for lifting the engine off its normal supports and a pair of mechanical jacks adapted to be connected to fixed supports and to the engine housing and to be used in turn for rotating the engine around the axis of the crank shaft until it reaches an inclined or substantially horizontal position.

Reference will now be made to the accompanying drawings which illustrate devices according to the invention applied by way of example to an internal combustion engine of the Diesel type having two mutually inclined banks of cylinders. In the drawings, Fig. 1 is a side elevation of the engine to illustrate the procedure prior to tilting, Fig. 2 is a view looking on the free end of the engine immediately prior to tilting, Fig. 3 is a view looking on the driving end of the engine immediately prior to tilting, Fig. 4 is an end view of the engine showing the first stage of tilting,

2

Fig. 9 is a sectional elevation of an operating jack.

Figure 1:
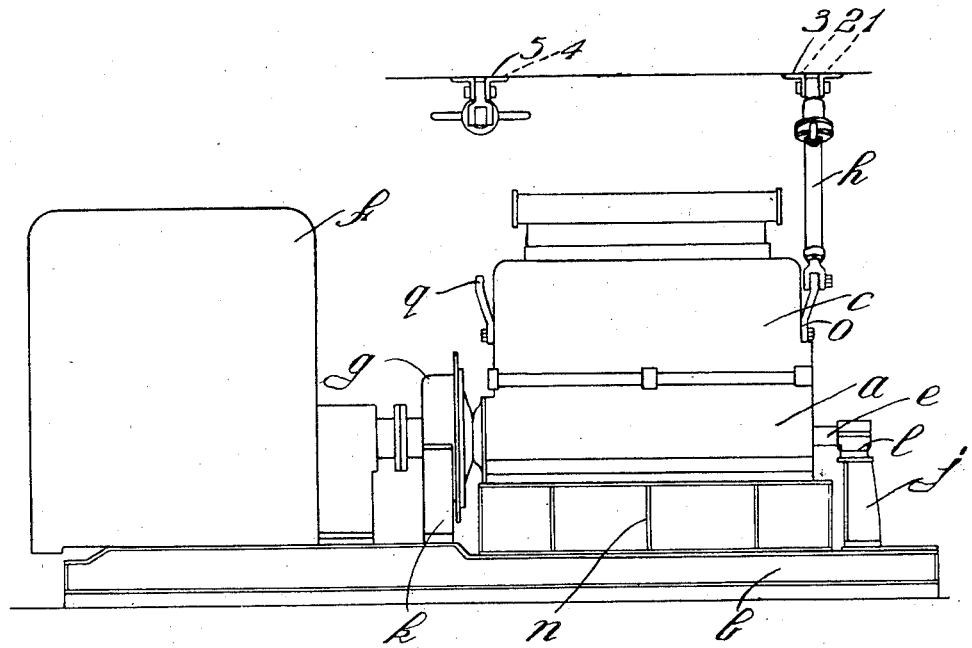

In the construction illustrated an internal combustion engine including a crank case $a$, two banks of cylinders $c$ and $d$ mounted on the crank case and a crank shaft $e$ is adapted to operate a driven unit which may be a pump, propeller shaft or generator, shown diagrammatically at $f$ in Fig. 1, through the medium of a flexible coupling device $g$. The tilting equipment includes essentially two screwjacks $h$ and $i$ each of which is adapted to be connected at its lower end to the engine, as hereinafter described. The jack $h$ can be detachably connected at its upper end to one of three brackets 1, 2 and 3 and the jack $i$ is capable of similar connection to brackets 4 and 5, all of said brackets 1—5 being fixed to the roof or an overhead structural component of the engine room.

The tilting equipment also includes two brackets $j$ and $k$ each embodying lifting jack screws $j'$ or $k'$ respectively and each adapted to be detachably mounted on the base plate $b$ of the engine and secured thereto by bolts $j^2$ and $k^2$ respectively. The first of these $j$ is adapted to support a plummer block $l$ adapted to engage an extension $m$ which is fitted to the free end of the crank shaft $e$. The second bracket $k$ is constructed with a semi-circular bearing surface (see Fig. 3) to engage around the cover of the flexible coupling device $g$.

When it becomes necessary to tilt the engine for examination or repair the preparatory procedure is as follows:

All connections to apparatus external to the engine such as exhaust and other pipes, are removed.

The engine is disengaged from the driven apparatus by dismantling the coupling $g$ and bolting the cover thereof onto the engine. The extension $m$ is fitted to the crank shaft, the brackets $j$ and $k$ are placed in position and the engine lifted vertically, after loosening the bolts $j^2$ and $k^2$, by operating the jack screws $j'$ and $k'$ embodied in the brackets until the stool plates $n$ can be removed from under the engine. In practice it is only necessary to take the weight of the engine off the bearers so that the amount of lift required is very small indeed.

In order to connect the jacks $h$ and $i$ to the engine, plates $o$ and $p$ are bolted onto the cylinder components at the free end and plates $q$ and $r$ are bolted in similar positions at the driving end. The plates $o$—$r$ are of triangular form and are fixed adjacent their base angles to the engine, their apexes being off-set as shown in Fig. 1, and provided with holes for the attachment of fastening means carried at the lower ends of the jacks $h$ and $i$ as hereinafter described. The plates $q$ and $r$ occupy positions behind and co-incident with the plates $o$ and $p$ as seen in end elevation and a full view of the plates $q$ and $r$ is shown in Fig. 3.

Figures 2, 3:
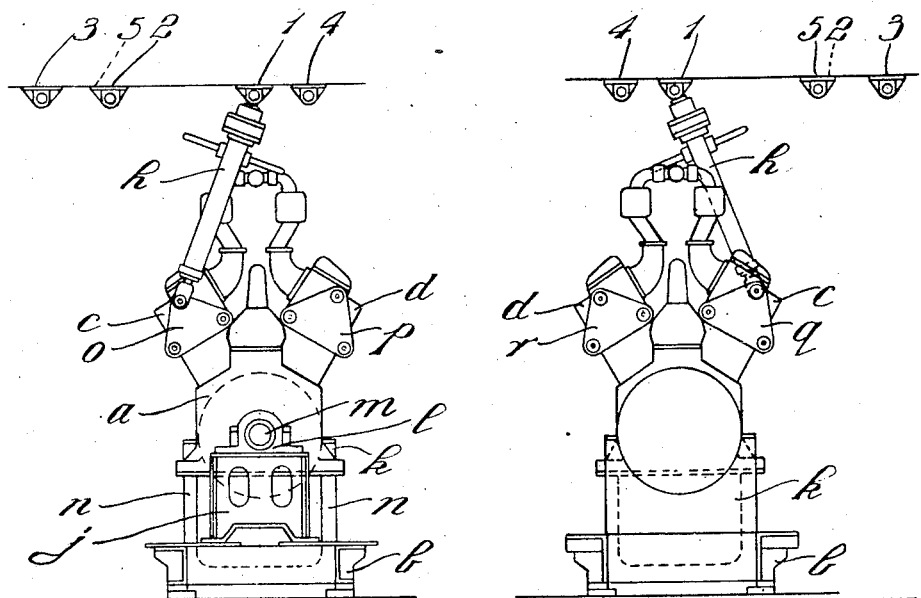

The jack $h$ already connected to the overhead bracket 1 is next swung into position and secured to the plate $o$ (see Fig. 2). The engine is then balancing on the crankshaft whose ends are actually supported by the brackets $j$ and $k$ and although the jack $h$ should be sufficient to hold the engine vertically ready for tilting, as shown in Fig. 2, chocks should be fixed under the side of the engine opposite the side towards which it is to be tilted to oppose any tendency to tilt in the undesired direction.

Figure 4:
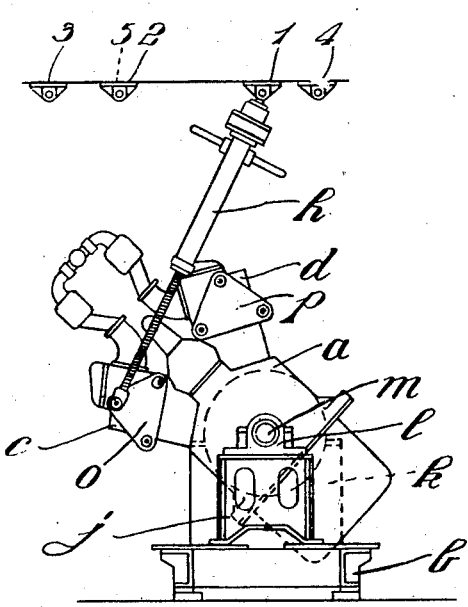

For the first tilting stage, the jack $h$ is utilised and is extended until by partial rotation around the axis of the crank shaft the engine reaches the position shown in Fig. 4, wherein its vertical axis makes an angle of the order of 48.5 degrees with the normal vertical axis.

Figure 5:
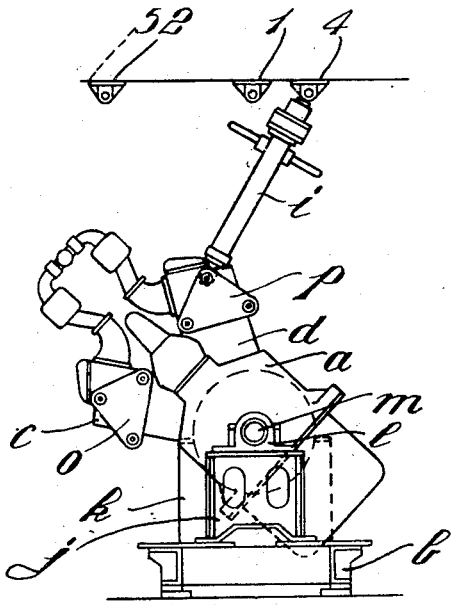
Figs. 5 and 6 are end views showing further stages in the tilting operation.
Figure 6:
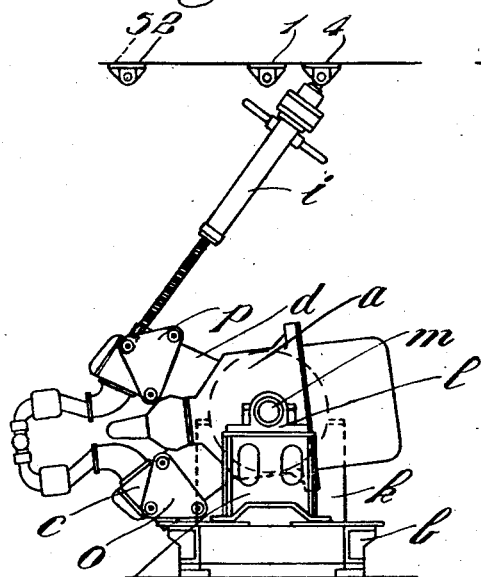
Figure 7:
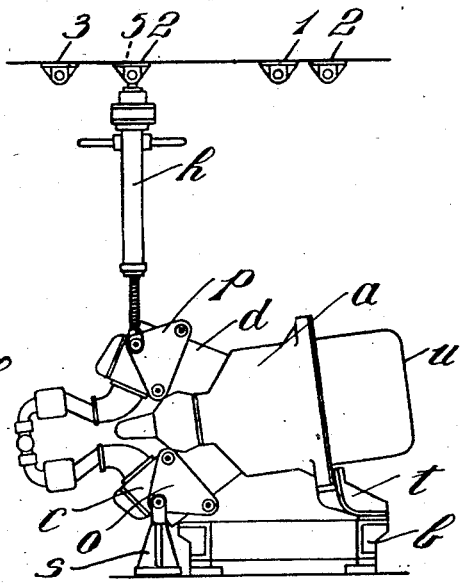
Fig. 7 is a view showing the engine secured in the tilted position.

Having reached the position shown in Fig. 4, operation of the jack $h$ is stopped and the jack $i$ already connected at its upper end to the bracket 4, is swung into position and fixed to plate $r$ at the driving end of the engine as shown in Fig. 5, jack $h$ being thereafter removed. By operation of jack $i$ the engine is further tilted, still about the axis of the crankshaft, until the position shown in Fig. 6 is reached wherein the vertical axis of the engine makes an angle of 97 degrees with its normal vertical position. The engine is now in its final tilted position and to secure it in this position while repairs, replacement or adjustments are made, the jack $h$ is reinstated in a vertical position between bracket 2 and plate $p$ and thereafter, the position of the jack $i$ is changed to a vertical one wherein it is connected between bracket 5 and plate $r$. For this purpose the brackets 2 and 5 are mounted in alignment in a plane parallel to the normal axis of the engine which passes through bracket 1. This final position is shown in Fig. 7 wherein are also shown supports $s$ and $t$ to hold the engine firmly in the tilted position, supports $s$ being bolted to the apexes of plates $o$ and $r$ and supports $t$ being bolted to the base plate $b$ and the upturned base of the crank case $a$. The jack screws $j'$ and $k'$ in brackets $j$ and $k$ are lowered and with the plummer block $l$ are removed. The coupling cover $g$ is also removed as well as the lubricating oil sump $u$ which enables access to be gained to the main bearings, caps and crankshaft.

To restore the engine to normal position, the procedure above described is reversed, that is to say, the jack $i$ is utilised to return the engine to the position shown in Fig. 5, and thereafter the jack $h$ is used to complete the restoration to the normal upright position shown in Fig. 2. The stool plates $n$ are then replaced, the jack screws $j'$ and $k'$ in brackets $j$ and $k$ are operated to lower the engine, the coupling $g$ is re-connected and all interrupted connections remade.

A preferred form of jack for use as $h$ or $i$ in the preceding description is shown in Fig. 9. This jack consists of a cylinder 6 having an internally screw-threaded sleeve 7 fixed in its lower end through which passes a screw-threaded rod 8 whose lower end is forked at 9 and provided with a bolt 10 for attachment to the plate $o$, $p$, $q$ or $r$ around the offset apex of which the forked portion 9 engages. The bolt 10 has a necked portion 11 with which a locking screw 12 is caused to engage after the rod has been operatively connected to the plate.

The cylinder 6 has operating handles 13 projecting laterally from it whereby the cylinder can be rotated to cause axial movement of the rod 8 according to whether the engine is being tilted or returned to upright position. To permit rotation of the cylinder 6 its upper end has fixed to it an annular disc 14 which with a ring 15 and a disc 16 forms a housing the components of which are secured together by means of bolts 17. The housing encloses a nut 18 at the end of a short spindle 19 whose upper end consists of an eye 20 adapted to be inserted between the cheeks 21 of a bracket, of the kind used at 1, 2, 3, 4 or 5 in Figs. 1–6, the eye 20 being secured in the bracket by means of a bolt 22. Between a flange 23 on the spindle 19 and the nut 18 is arranged a thrust bearing consisting of ball races 24 separated by an annular flange 25 forming part of an extension 26 of the disc 16 which houses the said bearings. The cylinder 6 with its attached components 15, 16 and 26 can, therefore, turn freely around the spindle 19 when the jack is being operated to raise or lower the engine.

Figure 8:
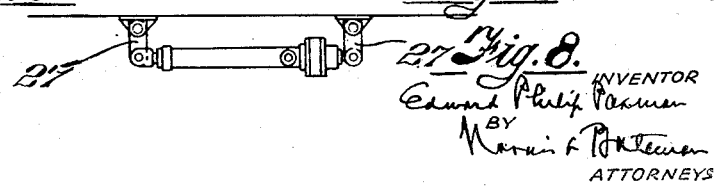
Fig. 8 is a detail view showing one of the operating jacks in its inoperative position.

When not in use, the jack above described can be suspended from two of the overhead brackets as shown in Fig. 8, short links 27 being provided to connect the forked ends 9 of rod 8 (fully retracted) and the eye 20 to the cheeks 21 of the brackets.

The arrangement above described has particular advantages where engines are disposed in confined spaces on ships as it enables repairs and adjustments to be effected which would otherwise entail complete dismantling of the engine or a very substantial part of it.

The arrangement described and illustrated in the accompanying drawings is susceptible to various modifications to meet particular conditions. For example, instead of connecting the jacks $h$ and $i$ to overhead structural components they can be connected to the floor while the jacks embodied in the brackets $j$ and $k$ can be constituted as fixed parts of the engine structure. Further, it is not always necessary to disengage an engine from the driven apparatus as the engine can in some instances be rotated around such apparatus as in the case of a generator.

Figure 12:
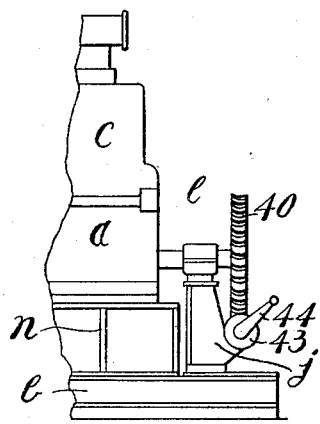
Figs. 12 and 13 are respectively a side elevation of one end, and an end view of an engine, showing another alternative arrangement for tilting it.
Figure 13:
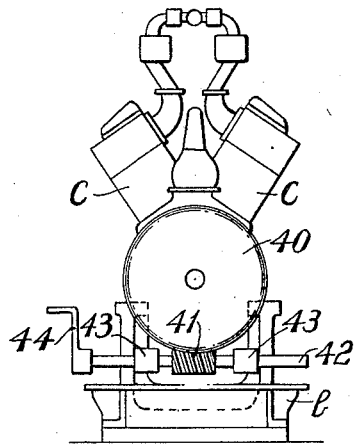
Figure 14:
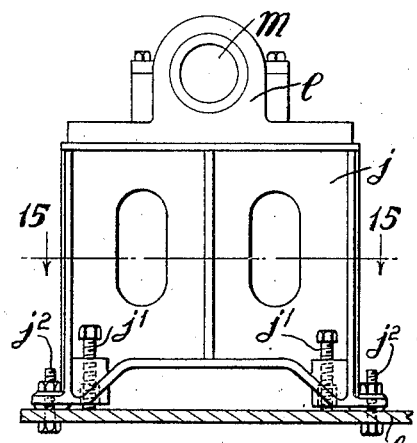
Fig. 14 is an elevation of one of the engine lifting brackets.
Figure 16:
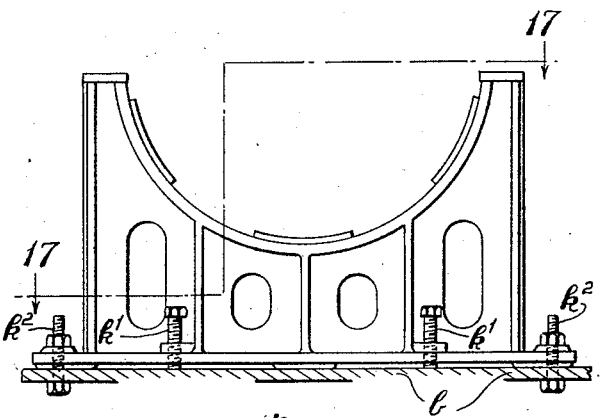
Fig. 16 is an elevation of the other engine lifting bracket.
Figure 15:
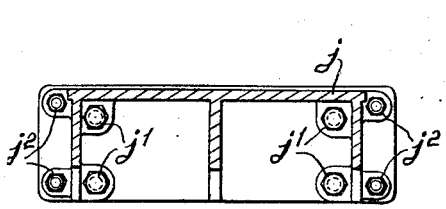
Fig. 15 is a section on the line 15—15 in Fig. 14.
Figure 17:
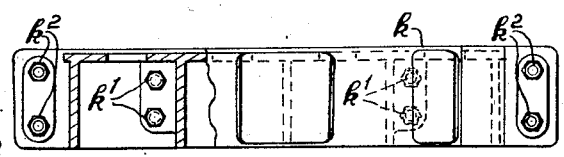
Fig. 17 is a section on the line 17—17 in Fig. 16.

The arrangement described also enables the invention to be applied to existing engines but in cases where it is desired to incorporate the invention in the construction of an engine the ends of the crank shaft can be fitted with toothed wheels or sectors adapted to be engaged by hand or power operated gearing to rotate the engine to any desired position when the normal supporting members are removed. Such an arrangement is shown in Figs. 12 and 13 in which a worm wheel 40 is fixed to an end of the crank shaft of the engine and meshes with a worm 41 mounted on a transverse shaft 42 journaled in relatively fixed bearings 43, one end of the worm shaft being provided with a crank 44 for rotating it. It will be understood that in using such an arrangement, the engine crank shaft must first be locked to the engine to prevent its rotation, as by locking the engine output coupling to the engine or restricting the piston travel of the engine.

According to another form of the invention, trunnions or bearing faces can be formed in or attached to the ends of the engine crank case or cylinders and are engaged by bearing surfaces on the adjustable supporting devices when the engine is to be rotated. Two examples of this modified form of construction are illustrated in Figs. 10 and 11.

Figure 10:
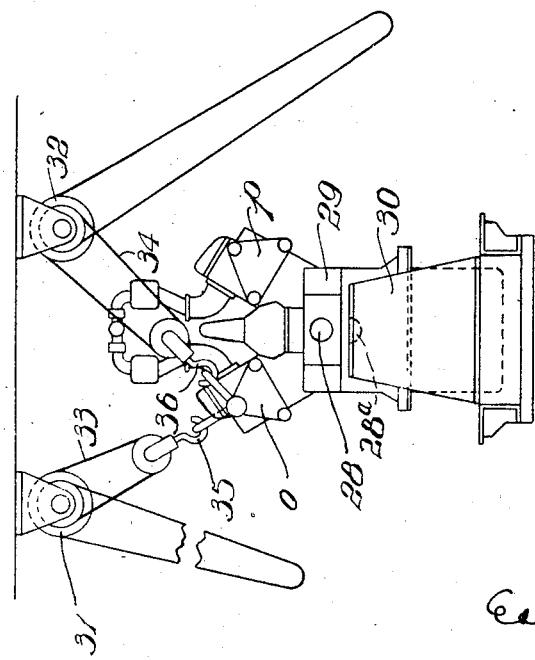
Fig. 10 is an end elevation showing an alternative arrangement of tilting gear.

In the arrangement shown in Fig. 10, the engine is provided at its ends with trunnions 28 carried on bent plates 29 attached to each end of the engine, the trunnions being engaged in recesses 29ª in the respective supporting brackets 30 which embody lifting jacks or jacking screws to lift the upper portions of the brackets into engagement with the trunnions when the engine is to be tilted. This figure also illustrates the use of slings instead of jacks for performing the tilting operation. Above and at opposite ends of the engine are mounted two differential pulley blocks 31 and 32 around which pass chains forming slings 33 and 34 carrying hooks 35 and 36 adapted to be connected to the plates *o*, *p*, *q* and *r* in sequences similar to those already described for using the packs to tilt the engine about its trunnions 28.

Figure 11:
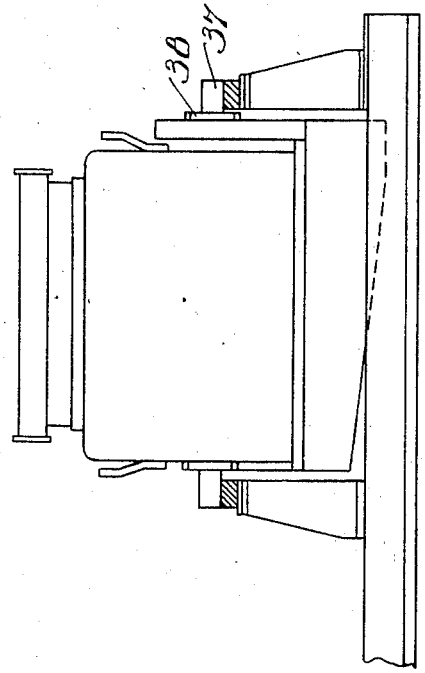
Fig. 11 is a side elevation of an engine fitted with trunnions.

In Fig. 11, the trunnions 37 are formed integral with flanges 38 adapted to be fixed directly to the end covers of the engine and to form permanent fixtures thereon. In this case the jacks shown in Figs. 1–9 or the slings shown in Fig. 10 can be employed for tilting. In the arrangements shown in Figs. 10 and 11 the axis of rotation is not the axis of the crank shaft but can conveniently be an axis passing through the centre of gravity of the engine.

I claim:

1. In an internal combustion engine plant embodying an engine base, and an internal combustion engine having means for mounting it in operative position on the base and having parts projecting longitudinally from its ends, means for tilting the engine relatively to its base to render a component of the engine accessible for servicing comprising brackets secured to the engine above said projecting parts and at relatively opposite sides of a vertical plane passing through said projecting parts, means on the base cooperable with said projecting parts for lifting the engine from its operative position on the base and for supporting the engine for tilting motion above the base and about said projecting parts as a longitudinal axis, a plurality of supports fixed relatively to and mounted above the engine base and spaced transversely of the latter, and means engageable with one of said supports and one of said brackets for tilting the engine laterally about said parts as an axis into an inclined position above the base, and means engageable with another of said supports and another of said brackets for lowering the upper part of the engine from said inclined position about said axis to a reclining position above the base and thereby rendering a component of the engine accessible for servicing.

2. In an internal combustion engine plant embodying an internal combustion engine base, an internal combustion engine having means for mounting it in operative position on the base and having parts projecting longitudinally from its ends, and means for tilting the engine relatively to the base to render a component thereof accessible for servicing comprising a pair of brackets secured to the engine above said projecting parts and respectively at opposite sides of a vertical plane passing through said projecting parts, means on the base and cooperative with said projecting parts for lifting and supporting the engine for rotation above the base and laterally about said parts as a longitudinal axis, a plurality of supports fixed relatively to and mounted above the engine base and spaced transversely of the latter, a jack having means for detachably connecting it to one of said supports and to one of said brackets and operable to tilt the engine laterally about said projecting parts as a longitudinal axis from an upright position to an inclined position, and another jack having means for connecting it to another of said supports and to the other of said brackets for lowering the upper portion of the engine about said axis into a reclining position above the base and thereby rendering a component of the engine accessible for servicing.

3. In an internal combustion engine plant embodying an engine base, and an internal combustion engine having means for mounting it in operative position thereon and having parts projecting longitudinally from its ends, means for tilting the engine laterally relatively to the base to render a component of the engine accessible for servicing comprising a pair of brackets secured to the engine above said parts and at relatively opposite sides of a vertical plane passing through said parts, means on the base cooperative with said projecting parts on the engine for lifting the engine from the base and for supporting the engine for rotation above the base about said projecting parts as a longitudinal axis, a plurality of supports mounted in fixed positions above the engine base and spaced transversely thereof, means engageable with one of said supports and with one of said brackets on the engine for tilting the latter laterally relatively to the base and about said axis into an inclined position, and means engageable with another of said supports and with the other of said brackets for further tilting the engine about said axis into a reclining position above the base and thereby rendering a component of the engine accessible for servicing.

4. In an internal combustion engine plant embodying an engine base, and an internal combustion engine having means for mounting it in operative position thereon and having parts projecting longitudinally from its ends, means for tilting the engine laterally relative to the base to render a component of the engine accessible for servicing comprising a pair of brackets secured to the engine above said projecting parts and at relatively opposite sides of a vertical plane passing through said parts, means on the base cooperative with said projecting parts on the engine for lifting the engine from the base and for supporting the engine for lateral tilting movement above the base about said projecting parts as a longitudinal axis, a plurality of supports mounted in fixed positions above the engine base and spaced transversely thereof, means engageable with one of said supports and with one of said brackets on the engine for tilting the latter laterally relatively to the base about said axis into an inclined position, and disengageable from said support and engageable with another of said supports and with the other of said brackets for holding the engine in a reclining position above the base, and means engageable with one of said supports and with one of said brackets for tilting the engine from said inclined position to said reclining position.

EDWARD PHILIP PAXMAN.

REFERENCES CITED

The following references are of record in the file of this patent:

UNITED STATES PATENTS

| Number | Name | Date |
|---|---|---|
| 1,079,697 | Fleet | Nov. 25, 1913 |
| 1,131,027 | Arnholm | Mar. 20, 1917 |
| 1,219,460 | Impson | Mar. 20, 1917 |
| 1,277,532 | Beltner | Sept. 3, 1918 |
| 1,311,685 | Frees | July 29, 1919 |
| 1,331,938 | McConnell et al. | Feb. 24, 1920 |
| 1,429,327 | Daniell | Sept. 19, 1922 |
| 1,435,860 | Koster | Nov. 14, 1922 |
| 1,600,835 | Manley | Sept. 21, 1926 |
| 1,637,604 | Clark | Aug. 2, 1927 |
| 1,646,062 | McLaughlin | Oct. 18, 1927 |
| 2,182,743 | Clergy | Dec. 5, 1939 |
| 2,271,213 | Weldner et al. | Jan. 27, 1942 |
| 2,329,613 | Hokanson et al. | Sept. 14, 1943 |
| 2,383,503 | Landis | Aug. 28, 1945 |

FOREIGN PATENTS

| Number | Country | Date |
|---|---|---|
| 317,249 | Germany | 1919 |
| 354,375 | Great Britain | Aug. 10, 1931 |